United States Patent [19]

Käfer et al.

[11] 4,400,491

[45] Aug. 23, 1983

[54] COPOLYESTER CARBONATES AND THE ADMIXTURE THEREOF WITH KNOWN POLYCARBONATES TO GIVE THERMOPLASTIC MOULDING COMPOSITIONS

[75] Inventors: Peter Käfer, Krefeld; Leo Morbitzer, Cologne; Werner Nouvertne; Dieter Neuray, both of Krefeld, all of Fed. Rep. of Germany

[73] Assignee: Bayer Aktiengesellschaft, Leverkusen, Fed. Rep. of Germany

[21] Appl. No.: 379,375

[22] Filed: May 17, 1982

[30] Foreign Application Priority Data

May 23, 1981 [DE] Fed. Rep. of Germany ....... 3120594

[51] Int. Cl.$^3$ ............................................. C08G 63/64
[52] U.S. Cl. ................................... 525/439; 525/444; 525/466; 528/173; 528/176; 528/191; 528/193; 528/194; 528/195; 528/196; 528/200; 528/201; 528/202; 528/203; 528/204; 528/370; 528/371; 528/372
[58] Field of Search ............... 528/176, 173, 193, 194, 528/195, 191, 196, 200–204, 370–372; 525/439, 444, 466

[56] References Cited

U.S. PATENT DOCUMENTS

| | | | |
|---|---|---|---|
| 2,496,933 | 2/1950 | Caldwell | 528/195 |
| 3,030,331 | 4/1962 | Goldberg | 528/195 |
| 4,156,069 | 5/1979 | Prevorsek et al. | 528/193 |
| 4,169,868 | 10/1979 | Schreckenberg et al. | 525/439 |
| 4,191,705 | 3/1980 | Lindner et al. | 260/463 |
| 4,216,298 | 8/1980 | Schreckenberg et al. | 525/439 |
| 4,217,297 | 8/1980 | Lindner et al. | 260/463 |
| 4,252,922 | 2/1981 | Adelmann et al. | 525/439 |
| 4,255,556 | 3/1981 | Segal et al. | 528/193 |
| 4,267,303 | 5/1981 | Konig et al. | 528/171 |
| 4,284,757 | 8/1981 | Fayolle | 528/193 |
| 4,297,455 | 10/1981 | Lindner et al. | 525/439 |

FOREIGN PATENT DOCUMENTS 6965 1/1980 European Pat. Off.

*Primary Examiner*—Lester L. Lee
*Attorney, Agent, or Firm*—Gene Harsh; Lawrence S. Pope; Aron Preis

[57] ABSTRACT

The new thermoplastic copolyester carbonates which are based on polybutylene glycols and hexahydrophthalic acid or trimethyladipic acid, as well as admixtures of copolyester carbonates of this type with known polycarbonates are suitable for thermoplastic moulding compositions, particularly where good stability to solvents, such as petrol, is required.

9 Claims, No Drawings

COPOLYESTER CARBONATES AND THE ADMIXTURE THEREOF WITH KNOWN POLYCARBONATES TO GIVE THERMOPLASTIC MOULDING COMPOSITIONS

The present invention relates to new copolyester carbonates, to thermoplastic moulding compositions obtained by admixture of such copolyester carbonates with known polycarbonates, and to sheets or other mouldings obtained therefrom.

According to the present invention, we provide a thermoplastic copolyester carbonate of formula (I) composed of structural units of the formula (IA) and (IB)

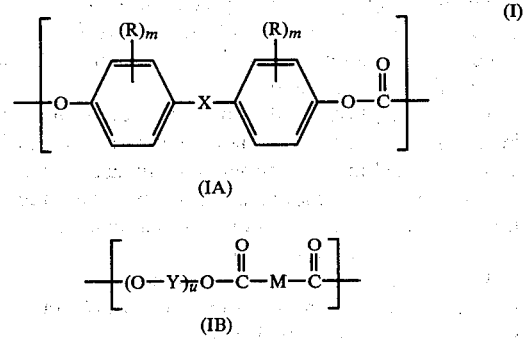

wherein
R denotes a hydrogen, chlorine or bromine atom or a $C_1$ to $C_3$ alkyl group,
m is 0, 1 or 2,
X denotes a direct bond or a $C_1$ to $C_8$ alkylene, $C_2$ to $C_8$ alkylidene, cyclohexylene, cyclohexylidene, $-SO_2$ or $-S$ radical,
Y denotes $-(CH_2)-_4$,
M denotes a radical of hexahydrophthalic acid or a radical or trimethyladipic acid, and
u is an integer of from 10 to 50, preferably from 12 to 30,
said copolyester carbonate having an average weight $\overline{Mw}$ (measured by light scattering methylene chloride) of from 15,000 to 200,000, preferably from 20,000 to 80,000, and which contains 50 to 95% by weight, preferably 80 to 95% by weight, of aromatic polycarbonate segments (composed of segments of formula (IA)) and 50 to 5% by weight, preferably 20 to 5% by weight, of polyester segments (composed of segments of formula (IB)) with an average number-average molecular weight Mn (measured by osmosis in methylene chloride) of from 2,000 to 20,000, preferably from 4,000 to 16,000.

The number and proportions of the particular structural units of formulae (IA) and (IB) correspond, in each case, to specified total molecular weight Mw and the number-average molecular weight Mn of the polyester segment.

According to the present invention we further provide a thermoplastic moulding composition consisting of a mixture of an aromatic polycarbonate of the general formula

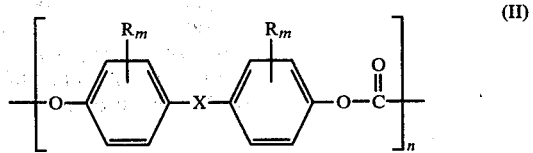

wherein
R, m and X have the meaning mentioned for formula (IA) and
n is the degree of polymerisation of from 20 to 400, preferably from 25 to 60,
and a copolyester carbonate of the formula (I) present invention having a content of polyester segments of from 50 to 20% by weight, relative to the polyester carbonate weight, in which characterised in that the mixing ratio is chosen to give a content of polyester segments in the moulding composition of between 20% by weight and 5% by weight.

The copolyester carbonates or moulding compositions according to the invention have an outstanding stability to petrol.

Copolyester carbonates and their preparation are known (see, for example, our DE-OS en No. (German Published Specification) 2,636,783, 2,651,639, 2,726,376, 2,712,435, 2,726,417, 2,837,526 and 2,935,317. In these references, hexahydrophthalic anhydride, adipic acid and polybutylene glycols are mentioned, in addition to many others, as building blocks for the preparation of the polyester segments, but trimethyladipic acid is not mentioned.

Moreover, it was not possible to derive from these references the fact that the specific choice of copolyester carbonates according to the present invention would have outstanding stability to petrol.

Mixtures of polycarbonates and polyester carbonates are also known (see our European Published Patent Application 4,020). Once again, adipic acid and poly (tetramethylene oxide)-$\alpha,\omega$-diols, but not hexahydrophtalic anhydride or trimethyladipic acid, are mentioned as building blocks for the preparation of the polyester segments. Moreover, it was not possible to derive even from our European Published Patent Application 4,020 the fact that the specific moulding compositions according to the present invention would have an outstanding stability to petrol.

Suitable building blocks for the copolyester carbonates according to the invention are polybutylene glycols=poly(tetramethylene oxide)-$\alpha,\omega$-diols=Polytetrahydrofuran having average molecular weights Mn (number average) of from 1,000 to 2,000, trimethyladipic acid (industrial mixture of 2,2,4-trimethyladipic acid or 2,4,4-trimethyladipic acid) and hexahydrophtalic anhydride.

For the preparation of the polycarbonates and the copolyester carbonates, suitable diphenols are those of the formula (III)

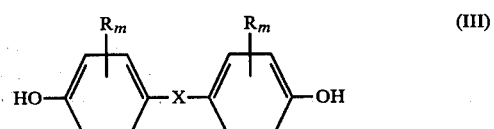

wherein R, m and X have the meaning mentioned for formula (IA).

Suitable diphenols of the formula (III) are 4,4'-dihydroxydiphenyls, bis-(4-hydroxyphenyl)-$C_1$-$C_8$-alkanes, bis-(4-hydroxyphenyl)-cyclohexanes, bis-(4-hydroxyphenyl) sulphides and bis-(4-hydroxyphenyl)-sulphones, as well as the corresponding compounds substituted in the phenyl nuclei by chlorine, bromine and/or $C_1$-$C_3$-alkyl radicals.

Suitable diphenols are described, for example, in U.S. Pat. Nos. 3,028,365, 3,275,601, 3,250,744, 3,062,781 and 2,999,846, and in German Offenlegungsschriften (German Published Specifications) Nos. 1,570,703, 2,063,050, 2,063,052, 2,211,956 and 2,211,957, French Patent Specification 1,561,518 and in the monograph "H. Schnell, Chemistry and Physics of Polycarbonates, Interscience Publishers, New York, 1964".

Examples of preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1-bis-(4-hydroxyphenyl)-cyclohexane, 1,1-bis-(4-hydroxyphenyl)-propane, 1,1-bis-(4-hydroxyphenyl)-butane, bis-(4-hydroxyphenyl) sulphide and bis-(4-hydroxyphenyl)sulphone.

In addition, the copolycarbonates can be branched by the incorporation of small quantities, preferably of quantities between 0.05 and 2.0 mol% (relative to diols employed), of tri-functional or greater than tri-functional compounds, particularly those with three, or more than three, phenolic hydroxyl groups.

Polycarbonates of this type are described, for example, in German Offenlegungsschriften (German Published Specifications) Nos. 1,570,533, 1,595,762, 2,116,974, 2,113,347 and 2,500,092, British Patent Specification No. 1,079,821 and U.S. Pat. No. 3,544,514.

Polyesters which are obtained, according to known processes, by the reaction of polytetrahydrofurans with trimethyladipic acid or hexahydrophthalic anhydride (see, for example, Houben-Weyl, volume 8, page 516 et seq., Georg Thieme Verlag Stuttgart, 1952) and which have a molecular weight $M_n$ (number average) of from 2,000 to approx. 20,000, preferably from 4,000 to 16,000, and which predominantly have aliphatic OH end groups, are suitable for the preparation of the polyester carbonates according to the invention, of the formula (I).

For this preparation, n mols of polytetrahydrofuran were heated to 200°-250° C. with (n-1) mols of trimethyladipic acid or hexahydrophthalic anhydride until the reaction was complete, the resulting water of reaction being distilled off if appropriate. The reaction can be accelerated by the addition of catalysts, for example n-butyl titanate. The number of mols n determines the polyester molecular weight which is to be adjusted. Instead of the trimethyladipic acid or the hexahydrophthalic anhydride, it is also possible to use the corresponding esters of lower alcohols for the preparation of the polyester.

The polyester carbonates according to the invention, of the general formula (I), are essentially prepared according to two known processes.

The preparation in the homogeneous phase, according to the pyridine process, is described, for example, by K. P. Perrey, W. J. Jackson, Jr. and J. R. Caldwell, Ind. Engl. Chem. Prod. Res. Develop. 2,246 (1963).

The preparation can also be effected in the heterogeneous phase, according to the phase boundary process (for example S. H. Merrill, J. Polymer Sci., 55, 343 (1961). For this process, the bis-chlorocarbonate of the polyester alcohol, which was previously prepared from polytetrahydrofuran and trimethyladipic acid or hexahydrophthalic anhydride, and phosgene are first prepared in the homogeneous phase, for example in methylene chloride as the solvent. A solution of bisphenols, for example bisphenol A, in sodium hydroxide solution is added to this solution. The entire mixture is condensed with phosgene at the phase boundary, in a known manner using amine catalysts and chain interrupters, to give the high molecular weight polyester carbonates.

The weight ratio of polyester to diphenol determines the proportion of polycarbonate segment of formula (IA) and polyester segment of formula (IB) in the end product, since the two processes for the preparation of the polyester carbonates proceed virtually without losses of reactants.

The working-up of the polyester carbonate solution is effected according to the methods known for polycarbonate, for example volatilisation of the solvent in devolatilisation extruders.

The preparation of the mixtures according to the invention from polycarbonates and polyester carbonates is effected in conventional mixing aggregates, such as kneaders and screw extruders, or by mixing the solutions of the two components and subsequent isolation via a devolatilisation extruder.

The copolyester carbonates according to the invention can be processed in a conventional manner to give sheets and other mouldings and can be employed wherever high notched impact strengths at low temperatures, high impact strengths in the case of large wall thicknesses, and good stability to solvents, particularly stability to petrol, are required. Corresponding comments apply to the industrial applicability of the admixtures according to the invention.

As customary, it is possible to add, during or after the preparation process, additives of all types to the copolyester carbonates according to the invention. In this connection, the following may be mentioned as examples: dyestuffs, pigments, mould release agents, stabilisers to the action of moisture, the action of heat and the action of UV light, lubricants, fillers, such as glass powder, quartz products, graphite, molybdenum sulphide, metal powders, powders of high-melting plastics, for example polytetrafluoroethylene powder, natural fibres, such as cotton, sisal and asbestos, and also glass fibres of the most diverse type, metal filaments, and plastic fibres which are stable during the residence in the melt of the polycarbonates and which do not noticeably damage the polycarbonates.

The stability, to petrol, of the polycarbonate moulding composition is tested, in test media, by storage of the appropriate mouldings, for example standard small rods, which are under a defined tension which is given by a particular elongation. A mixture of toluene/isooctane in the volume ratio of 1:1 is used as the test medium. The samples, which have a strain of 0.6%, are stored in the test medium for one hour. The products are then assessed visually with respect to breakage, the formation of cracks and discoloration.

The examples which follow illustrate the subject of the invention in more detail. The relative solution viscosities given are measured in methylene chloride at 25° C. and a concentration of 5 g/l.

EXAMPLES

EXAMPLE 1

(Comparative Example) corresponding to European Published Patent Application No. 4,020

(a) Preparation of the polycarbonate based on 4,4'-dihydroxydiphenyl-2,2-propane Approx. 454 parts of 4,4'-dihydroxydiphenyl-2,2-propane and 9.5 parts of p-tert.-butylphenol are suspended in 1.5 l of water. The oxygen is removed from the reaction mixture, in a 3-necked flask equipped with a stirrer and gas inlet tube, by passing nitrogen through the reaction mixture for 15 min. whilst stirring. 355 parts of 45% strength sodium hydroxide solution and 1,000 parts of methylene chloride are then added to the mixture. The mixture is cooled to 25° C. Whilst this temperature is maintained by cooling, 237 parts of phosgene are added during a period of 120 min.

An additional quantity of 75 parts of a 45% sodium hydroxide solution is added after 15–30 min., or after the phosgene uptake has begun. 1.6 parts of triethylamine are added to the corresponding solution, and the mixture is stirred for a further 15 min. A highly viscous solution is obtained, the viscosity of which is regulated by the addition of methylene chloride. The aqueous phase is separated off. The organic phase is washed, with water, until it is free of salt and alkali. The polycarbonate has a relative viscosity of 1.29, measured in a 0.5% strength solution of methylene chloride at 20° C. This corresponds to a molecular weight of approx. 32,000. The polycarbonate thus obtained is extruded and granulated.

(b) Preparation of a polyester carbonate 5 kg (0.38 mol) of a butanediol/adipic acid polyester having hydroxyl end groups and a molecular weight of 13,000 are dissolved in 30 l of methylene chloride. 320 ml (4.7 mols) of phosgene, dissolved in 5 l of methylene chloride, are added dropwise to this solution at 18° C., during the course of half an hour. The solution is stirred for 40 min., and an aqueous bisphenolate solution, consisting of 5 kg (22 mols) of bisphenol A and 29.5 kg (48 mols) of 6.5% strength sodium hydroxide solution, is then added.

80 l of methylene chloride and 33 g (0.2 mol) of p-t-butylphenol are added to the mixture as a chain stopper. 400 g (4 mols) of phosgene are passed into the reaction mixture, at a pH value of 13, at 20° C. during the course of half an hour. 53.6 kg (87 mols) of 6.5% strength sodium hydroxide solution are required, in addition, to maintain the pH value. After the introduction of phosgene, 500 ml of 4% strength triethylamine solution are added as a condensation catalyst, and the mixture is stirred for 1 hour for further condensations. The working-up of the polyester carbonate is effected by evaporation of the solvent. A polyester carbonate having a relative viscosity of 2.10 (Mw 110,000; % by weight of polyester segment 47) is obtained.

(c) Preparation of the mixture 85 parts by weight of the polycarbonate from Example 1a are mixed, as a methylene chloride solution, with 15 parts by weight of the polyester carbonate from Example 1b, and the mixture is extruded at 320° C. and 0.1 mm Hg, via a devolatilisation extruder. The relative solution viscosity is 1.33.

Despite the good mechanical and thermal properties indicated in European Published Patent Application No. 4,020, the mixture exhibits a poor stability to petrol.

The samples of this mixture, which have a strain of 0.6%, break a few seconds after being dipped into a solution of toluene/isooctane (volume ratio 1:1).

EXAMPLE 2

(Comparative example)

10.5 kg (1.05 mols) of a polyether ester composed of 96.46 parts by weight of polytetrahydrofuran ($M_n = 2,000$) and 4.69 parts by weight of adipic acid having a molecular weight of 10,000 and 4.0 kg (17.5 mols) of bisphenol A are reacted, according to the process described in Example 1b, with phosgene to give a polyether ester carbonate having a relative solution viscosity of 2.30 (Mw 125,000; % by weight of polyester segment 70).

15 parts by weight of the polyether ester carbonate thus obtained and 85 parts by weight of a polycarbonate from Example 1a are mixed as methylene chloride solutions and extruded at 320° C. and 0.1 mm Hg, via a devolatilisation extruder. The relative solution viscosity is 1.31.

The samples of this mixture, which have a strain of 0.6, break 30 seconds after being dipped into a solution of toluene/isooctane (volume ratio 1:1).

EXAMPLE 3

(Comparative example)

1.05 kg (0.066 mol) of a polyether ester composed of 98.45 parts by weight of polyethylene glycol ($M_n = 6,000$) and 1.91 parts by weight of trimethyladipic acid having a molecular weight of 16,000 and 8.48 kg (37.2 mols) of bisphenol A are reacted, according to the process described in Example 1b, with phosgene and 178.3 g (1.189 mols) of p-tert-butylphenol as a chain stopper to give a polyester carbonate. The product is extruded at 320° C. and 0.1 mm Hg, via a devolatilisation extruder. The relative solution viscosity is 1.32 (Mw 33,000; % by weight of polyester segment 10).

The samples of this mixture, which have a strain of 0.6%, break 20 seconds after being dipped into a solution of toluene/isooctane (volume ratio 1:1).

EXAMPLE 4

10.5 kg (0.66 mol) of a polyether ester composed of 93.82 parts by weight of polytetrahydrofuran ($M_n = 2,000$) and 7.64 parts by weight of trimethyladipic acid having a molecular weight of 16,000 and 4.04 kg (17.7 mols) of bisphenol A are reacted, according to the process described in Example 1b, with phosgene to give a polyether ester carbonate with a relative solution viscosity of 1.91 (Mw 95,000; % by weight of polyester segment 70).

15% by weight of this polyether carbonate and 85% by weight of a polycarbonate according to Example 1a are mixed as methylene chloride solutions and extruded at 320° C. and 0.1 mm Hg, via a devolatilisation extruder. The solution viscosity of the mixture is 1.320. The properties of the product are given in Table I.

EXAMPLE 5

5 kg (0.31 mol) of a polyether ester composed of 94.42 parts by weight of polytetrahydrofuran ($M_n = 2,000$) and 6.31 parts by weight of hexahydrophthalic acid having a molecular weight of 16,000 and 5 kg (22 mols)

of bisphenol A are reacted, according to the process described in Example 1b, with phosgene to give a polyether ester carbonate with a relative solution viscosity of 1.85 (Mw 90,000, % by weight of polyester segment 47%).

15% by weight of this polyether ester carbonate and 85% by weight of a polycarbonate according to Example 1a are mixed as methylene chloride solutions and extruded at 320° C. and 0.1 mm Hg, via a devolatilisation extruder. The solution viscosity of the mixture is 1.317. The properties of the product are given in Table I.

EXAMPLE 6

1,05 kg (0.26 mol) of a polyether ester composed of 96.47 parts by weight of polytetrahydrofuran ($M_n=2,000$) and 4.38 parts by weight of trimethyladipic acid having a molecular weight of 4,000 and 8.48 kg (37.2 mols) of bisphenol A are reacted, according to the process described in Example 1b, with phosgene and 139.3 g (0.929 mol) of p-tert.-butylphenol as a chain stopper to give a polyether ester carbonate. The product is extruded at 320° C. and 0.1 mm Hg, via a devolatilisation extruder. The relative solution viscosity is 1.320. Mw 33,000 the properties of the product are given in Table I.

EXAMPLE 7

5 kg (1.25 mols) of a polyether ester composed of 91.01 parts by weight of polytetrahydrofuran ($M_n=1,000$) and 8.99 parts by weight of hexahydrophthalic acid having a molecular weight of 4,000 and 5 kg (22 mols) of bisphenol A are reacted, according to the process described in Example 1b, with phosgene to give a polyether ester carbonate with a relative solution viscosity of 1.93 ($M_w=95,000$, 47% by weight of polyester segment). 15% by weight of this polyether ester carbonate and 85% by weight of a polycarbonate according to Example 1a are mixed as methylene chloride solutions and extruded at 320° C. and 0.1 mm Hg, via a devolatilisation extruder. The solution viscosity of the mixture is 1.322. The properties of the product are given in Table I.

EXAMPLE 8

1.05 kg (0.066 mol) of a polyether ester composed of 94.42 parts by weight of polytetrahydrofuran ($M_n=2,000$) and 6.31 parts by weight of hexahydrophthalic acid having a molecular weight of 16,000 and 8.48 kg (37.2 mols) of bisphenol A are reacted, according to the process described in Example 1b, with phosgene and 139.3 g (0.929 mol) of p-tert.-butylphenol as a chain stopper to give a polyether ester carbonate. The product is extruded at 320° C. and 0.1 mm Hg, via a devolatilisation extruder. The relative solution viscosity is 1.325 ($M_w=34,000$, 10% by weight of polyester segment); the properties of the product are given in Table I.

TABLE I

| | Soft segment composed of | Polyester content of the mixture or of the co-condensate, % by weight |
|---|---|---|
| Example 1 (Comparative example) | butanediol/adipic acid | 7.1% |
| Example 2 (Comparative example) | polytetrahydrofuran/adipic acid | 10.5% |
| Example 3 (Comparative example) | polyethylene glycol/trimethyladipic acid | 10% |
| Example 4 | polytetrahydrofuran/trimethyladipic acid | 10.5% |
| Example 5 | polytetrahydrofuran/hexahydrophthalic acid | 7.1% |
| Example 6 | polytetrahydrofuran/trimethyladipic acid | 10% |
| Example 7 | polytetrahydrofuran/hexahydrophthalic acid | 7.1% |
| Example 8 | polytetrahydrofuran/hexahydrophthalic acid | 10.0% |

| Example No. | Molecular weight of the soft segment $M_n$ | Notched impact strength at room temperature | at −40° C. | Vicat B | Breakage in toluene/isooctane (1:1) at 0.6% strain after |
|---|---|---|---|---|---|
| 1. | 13,000 | 40 | 20 | 145 | 5 seconds |
| 2. | 10,000 | 42 | 17 | 146 | 30 seconds |
| 3. | 16,000 | 41 | 15 | 142 | 20 seconds |
| 4. | 16,000 | 45 | 21 | 144 | 1 hour, no formation of cracks |
| 5. | 16,000 | 38 | 18 | 143 | 1 hour, slight formation of cracks |
| 6. | 4,000 | 42 | 20 | 145 | 1 hour, no formation of cracks |
| 7. | 4,000 | 37 | 16 | 141 | 1 hour, slight formation of cracks |
| 8. | 16,000 | 41 | 19 | 145 | 1 hour, no formation of cracks |

We claim:
1. A thermoplastic copolyester carbonate of formula (I) composed of structural units of the general formulae (IA) and (IB);

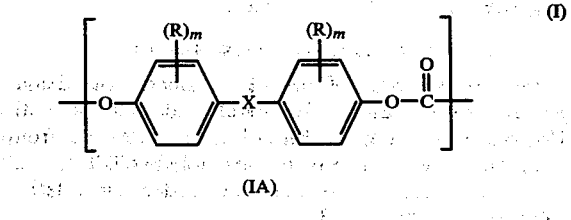

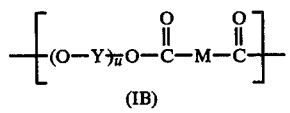

(IB)

wherein
- R denotes a hydrogen, chlorine or bromine atom or a $C_1$ to $C_3$ alkyl group,
- m is 0, 1 or 2,
- X denotes a direct bond or a $C_1$ to $C_8$ alkylene, $C_2$ to $C_8$ alkylidene, cyclohexylene, cyclohexylidene, $-SO_2$ or $-S$ radical,
- Y denotes $-(CH_2)_4$,
- M denotes a radical of hexahydrophthalic acid or a radical of trimethyladipic acid, and
- u is an integer of from 10 to 50, said copolyester carbonate having an average weight-average molecular weight $\overline{M}w$ of from 15,000 to 200,000, and which contains 50 to 95% by weight of aromatic polycarbonate segments and 50 to 5% by weight of polyester segments having an average number-average molecular weight $\overline{M}n$ of from 2,000 to 20,000.

2. A copolyester according to claim 1, wherein u is an integer from 12 to 30.

3. A copolyester carbonate according to claim 1 or 2 having an average weight-average molecular weight $\overline{M}w$ of 20,000 to 80,000.

4. A copolyester carbonate according to claim 1 or claim 2, which contains 80 to 95% by weight of aromatic polycarbonate segments and 20 to 5% by weight of polyester segments having an average number-average molecular weight of 4,000 to 16,000.

5. A thermoplastic moulding composition consisting of a mixture of an aromatic polycarbonate of the general formula

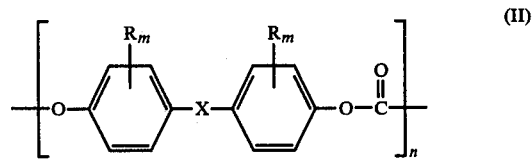

wherein
- R, m and X have the same meanings as in claim 1 for formula (IA), and
- n is the degree of polymerisation of from 20 to 400, and a copolyester carbonate according to claims 1 or 2 with a content of polyester segments of from 50 to 20% by weight, relative to polyester carbonate weight, in which mixing ratio of polycarbonate of the general formula (II) and a copolyester carbonate of the general formula (I) is chosen to give a content of polyester segments in the moulding composition of between 20% by weight and 5% by weight.

6. A moulding composition according to claim 5, wherein n is the degree of polymerisation of from 25 to 60.

7. A molded article formed from a copolyester carbonate according to claim 1.

8. An article moulded from the composition of claim 5.

9. The molded article of claim 7 in the form of a sheet.

* * * * *